F. P. GATES.
CHUCK.
APPLICATION FILED APR. 6, 1911.
1,063,917.
Patented June 3, 1913.
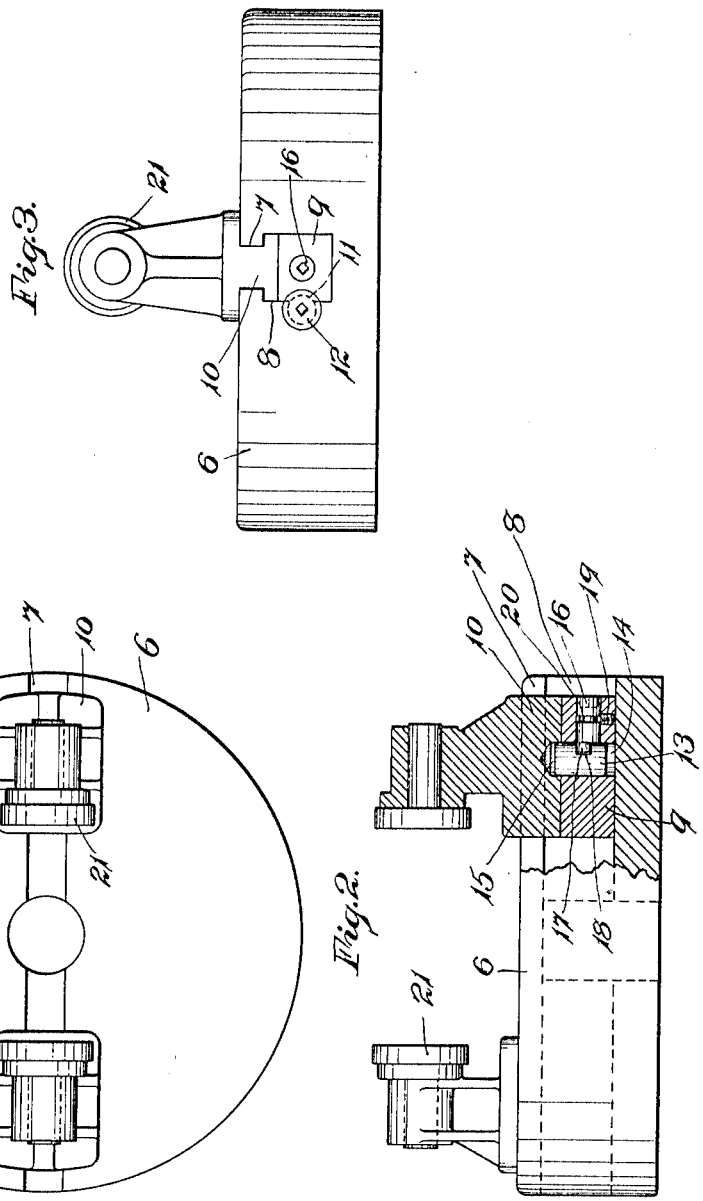
WITNESSES:
Eva L. Stoughton
Louis Lucia
INVENTOR.
Frederic P. Gates
BY Arthur B. Jenkins,
ATTORNEY.

UNITED STATES PATENT OFFICE.

FREDERIC P. GATES, OF NEWINGTON, CONNECTICUT, ASSIGNOR TO THE UNION MANUFACTURING COMPANY, OF NEW BRITAIN, CONNECTICUT, A CORPORATION OF CONNECTICUT.

CHUCK.

1,063,917.  Specification of Letters Patent.  Patented June 3, 1913.

Application filed April 6, 1911. Serial No. 619,276.

*To all whom it may concern:*

Be it known that I, FREDERIC P. GATES, a citizen of the United States, and a resident of Newington, in the county of Hartford and State of Connecticut, have invented a new and Improved Chuck, of which the following is a specification.

My invention relates more especially to that class of chucks having jaws located upon the face plate of the body of a chuck and movable radially thereon, and an object of my invention, among others, is to provide a device of this class which may be readily operated for the purpose of clamping work therein, or the clamping jaws of which may be readily removed for any purpose.

One form of device embodying my invention, and in the use of which the objects herein sought may be attained, is illustrated in the accompanying drawings, in which—

Figure 1 is a view looking at the face of a chuck body with my improved attachment applied thereto. Fig. 2 is a detail view partially in central section on a plane passing through the center of one of the jaws. Fig. 3 is a detail edge view of the chuck looking at the rear of one of the jaws.

My invention illustrated and described herein is not limited in its use with any special kind of chuck, as it will be found to possess advantage when applied to various kinds of chucks, but as I have especially demonstrated its applicability to a chuck used for turning fixtures in which two chuck jaws located opposite each other are employed, I have adopted such form of chuck for the purpose of illustrating my invention herein.

In the accompanying drawings the numeral 6 denotes a chuck body of any suitable form and material, within which slots 7 are formed extending radially of the body and in such numbers as may be desired, in the special form of device herein illustrated there being two of these slots extending in line one with the other across the face of the chuck body. These slots open into jaw recesses 8 within the chuck body, the slots and recesses being of the usual T-shape in cross section to retain the chuck jaws in place while permitting them to slide radially of the chuck body.

In carrying out my invention I construct each jaw in two sections, a thread bearing section 9 and a jaw bearing section 10. This thread bearing section 9 is located within and is practically of the same width as the recess 8. A feed thread 11 (shown in dotted lines in Fig. 3) is formed on the edge of each thread bearing section, a feed screw 12 operatively engaging the thread on each section for the purpose of moving the jaw radially and in a manner common to devices of this class. The jaw bearing section of each jaw is of T-shape, to correspond with the cross sectional shape of the slot and that part of the recess not occupied by the thread bearing section, this shape being clearly seen in Fig. 3 of the drawings. That part of the jaw bearing section of each jaw located in the recess 8 is preferably of the same width as the thread bearing section and sits squarely upon the top thereof, and is held in place as by means of a locking bolt 13 movable longitudinally in an opening 14 in the thread bearing section of each jaw, the end of this bolt being formed to engage a locking recess 15 in the jaw bearing section of each jaw. An actuating pin 16 extends from the end of the thread bearing section of each jaw into the opening 14, each actuating pin having a stud 17 eccentrically located on the pin and projecting into a slot 18 formed across the locking bolt to be actuated thereby. Each actuating pin may be held in place as by means of a retaining screw 19 projecting into a groove 20 in each actuating pin, and each pin is provided with suitable means whereby it may be turned to operate the locking bolt, as herein shown the end of the pin being squared to receive a wrench.

Each jaw bearing section bears at its upper end a jaw 21 suitably formed to engage and clamp the work for which the jaw is designed, as herein shown these jaws being especially designed to clamp fixtures, as pipe unions upon which cutting operations are to be performed. It frequently happens in the manipulation of such articles that in order to place the article within the jaws the latter must be separated to permit passage of an enlarged part of the article, the jaws gripping the article upon a smaller part and being closed to position after the article is in place. It is a slow operation to move the jaws for such purposes by means of the feed screw, and frequently it becomes necessary to move the jaws to a greater extent even than may be obtained by the feed screws. With my improved device it becomes necessary simply to remove the locking bolt by means of the actuating pin 16 when a jaw section may be moved to the extent desired, or both jaw sections may be so moved if required. It will also be seen that jaws of different shape and form to grip work of various kinds and dimensions may be employed, the jaw sections being readily removed and replaced by such as may be required.

While I have shown and described herein a preferred form and construction of device embodying my invention this may be differently constructed within the scope of the following claims without avoiding the spirit and intent of the invention, and I do not therefore limit myself to the exact construction herein shown and described.

I claim—

1. A chuck body having a recess and a slot of less width opening to the face of the jaw, a feeding jaw section located within the recess, means for feeding said section to clamp and hold a piece of work, a jaw section having a T-shaped part fitting said slot and recess and with a jaw located outside of the face of the chuck, means for removably securing said feeding section and said jaw section together, and means for releasing said section to permit removal of the jaw section independently of the feeding section.

2. A chuck body, a sectional chuck jaw including a feeding section supported by the body, means for feeding said section, a jaw bearing section, a locking bolt to lock the two sections together, an actuating pin in engagement with said bolt to actuate it, and a jaw secured to said jaw bearing section.

3. A chuck body, a sectional chuck jaw supported by the body and including a feeding section, means for feeding said section, a jaw bearing section, a sliding bolt to lock said sections together, a rotating actuating pin having a stud eccentrically mounted and engaging said bolt to operate it, and a jaw secured to said jaw bearing section.

4. A chuck body having a recess with a narrower slot opening therefrom to the face of the body, a sectional chuck jaw including a feeding section located in said recess, means for feeding said section, a jaw bearing section having an enlarged part located in said recess and a narrower part extending through said slot with a jaw located outside of the face plate of the chuck, a locking bolt to lock said sections together and an actuating pin in engagement with said bolt to operate it.

5. A chuck body having a recess with a narrower slot opening to the face of the body, a sectional chuck jaw including a feeding section located in said recess and a jaw bearing section having a part located in said recess and a narrower part located in said slot, with a jaw located outside said body, a locking bolt borne by the feeding section and adapted to enter a recess in the jaw bearing section, and an actuating pin borne by the feeding section in engagement with said bolt to operate it.

6. A chuck body having a recess with a narrower slot opening to the face of the body, a sectional chuck jaw including a feeding section located in said recess and a jaw bearing section having an enlarged part located in said recess and a narrower part projecting through said slot with a jaw located outside of the chuck body, a locking bolt borne by one of said sections to engage a recess in the opposite section and a locking pin rotatably mounted in one of said sections to actuate the bolt and having a stud eccentrically located on the pin and in engagement with said bolt.

7. A chuck body having a recess with a narrower slot opening to the face of the chuck body, a sectional chuck jaw including a feeding section located in said recess, means for feeding said section, a jaw bearing section having a part located in said recess and a narrower part located in said slot, a jaw borne by said section outside of said body, a locking bolt borne by the feeding section to engage a recess in the jaw bearing section, an actuating pin rotatably mounted in the feeding section, and a stud eccentrically mounted on said locking pin and located in an opening in said bolt to actuate the same.

FREDERIC P. GATES.

Witnesses:
ARTHUR B. JENKINS,
E. L. STOUGHTON.

---

Copies of this patent may be obtained for five cents each, by addressing the "Commissioner of Patents, Washington, D. C."